United States Patent
Chen

(10) Patent No.: US 9,584,229 B2
(45) Date of Patent: Feb. 28, 2017

(54) DATA RETRANSMISSION METHOD, APPARATUS, AND SYSTEM

(71) Applicant: Huawei Device Co., LTD, Shenzhen (CN)

(72) Inventor: Zhenwei Chen, Xi'an (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 235 days.

(21) Appl. No.: 13/900,785

(22) Filed: May 23, 2013

(65) Prior Publication Data

US 2013/0329573 A1 Dec. 12, 2013

Related U.S. Application Data

(63) Continuation of application No. PCT/CN2011/072965, filed on Apr. 18, 2011.

(51) Int. Cl.
| | |
|---|---|
| H04L 1/18 | (2006.01) |
| H04B 17/02 | (2006.01) |
| H04B 17/40 | (2015.01) |
| H04L 1/00 | (2006.01) |

(52) U.S. Cl.
CPC ............ *H04B 17/02* (2013.01); *H04B 17/40* (2015.01); *H04L 1/1806* (2013.01); *H04L 1/189* (2013.01); *H04L 2001/0097* (2013.01)

(58) Field of Classification Search
None
See application file for complete search history.

(56) References Cited

U.S. PATENT DOCUMENTS

2007/0004437 A1*  1/2007  Harada ............... H04L 5/023 455/506
2009/0175214 A1   7/2009  Sfar et al.
(Continued)

FOREIGN PATENT DOCUMENTS

| CN | 101174930 A | 5/2008 |
|---|---|---|
| CN | 101267241 A | 9/2008 |

(Continued)

OTHER PUBLICATIONS

Nikolaj Marchenko, "Incremental Cooperative Relaying in Time-Correlated Rayleigh Fading Channels", Dec. 6, 2010, pp. 1-5.*

(Continued)

*Primary Examiner* — Adnan Baig
(74) *Attorney, Agent, or Firm* — Slater Matsil, LLP

(57) ABSTRACT

A data retransmission method, apparatus, and system can improve a success ratio of data packet retransmission. A data retransmission method includes: after a source node continuously transmits at least two data packets to a destination node according to a go-back-N automatic repeat request, monitoring and decoding, by a relay node, the at least two data packets; storing a copy of a successfully decoded data packet; monitoring a response message to each data packet, where the response message is returned by the destination node to the source node; and sending a copy of a data packet that corresponds to a reception negative acknowledgment message to the destination node, when the monitored response message is the reception negative acknowledgment message.

11 Claims, 11 Drawing Sheets

(56) References Cited

U.S. PATENT DOCUMENTS

2010/0227606 A1* 9/2010 Nan .................. H04B 7/2606
455/422.1
2012/0127888 A1 5/2012 Fujishima et al.

FOREIGN PATENT DOCUMENTS

| CN | 101383685 A | 3/2009 |
|---|---|---|
| CN | 101605355 A | 12/2009 |
| JP | 07038492 | 2/1995 |
| JP | 2000312201 A | 11/2000 |
| JP | 2008048221 A | 2/2008 |
| JP | 2011509052 A | 3/2011 |
| JP | 2011071705 A | 4/2011 |
| WO | 2010150417 A1 | 12/2010 |
| WO | WO 2011/103836 A2 | 9/2011 |

OTHER PUBLICATIONS

Research in Motion, "Performance Analysis and DL/UL Transmission Schemes for Type-II Relay", Nov. 13, 2009, 3GPP TSG RAN R1-094466, pp. 1-11.*
International Search Report for PCT/CN2011/072965, mailed Feb. 16, 2012, 3 pages.
China Potevio Co., Ltd., "An improved uplink access way through coordinate communicate based on relay overhearing in LTE-advanced system," 3GPP TSG-RAN WG1 #55b, R1-090016, Ljubljana, Slovenia, Jan. 11-16, 2009, 11 pages.
First Office Action of Chinese Application No. 201180000361.0 mailed Nov. 5, 2012, 12 pages. (Partial Translation).
Extended European Search Report received in Application No. 11746878.5-1851 mailed Aug. 7, 2013, 11 pages.
Hayashida, Y., et al. "Throughput Analysis of Tandem Go-Back-N ARQ Scheme," Electronics and Communications in Japan, Part 1, vol. 73, No. 4, Apr. 1990, No. 4, Part I, New York, US, 7 pages.
Jin, Yan-Liang, et al., "Modeling TCP performance with proxy and ARQ," received in Journal of Zhejiang University Science A, Sep. 10, 2004, 8 pages.
Liu, Kuang-Hao, "Double Threshold Digital Relaying for Cooperative Wireless Networks," Institute of Computer and Communication Engineering, National Cheng Kuang Univerisity, Tainan, Taiwan, Date of Conference May 16-19, 2010, 5 pages.
Marchenko, N. et al., "Incremental Cooperative Relaying in Time-Correlated Rayleigh FAding Channels," University of Klagenfurt, Institute of Networked and Embedded Systems, Austria, Date of Conference Dec. 6-10, 2010, 5 pages.
QUALCOMM Europe, "Operation of relays in LTE-A," 3GPP TSG-RAN WG1 #54bis, R1-083810, Prague, Czech Republic, Sep. 29-Oct. 3, 2008, 5 pages.
Research in Motion UK Limited, "Performance Analysis and DL/UL Transmission Schemes for Type-II Relay," 3GPP TSG RAN WG1 Meeting #59, R1-094466, Jeju, Korea, Nov. 9-13, 2009, 11 pages.
Said, M., et al., "Cooperative ARQ Protocols for Dual-hop Systems," University of Carthage, Higher School of Communications of Tunis, Nov. 7, 2010, 5 pages.
Tacca, M. et al., "Cooperative and Non-Cooperative ARQ Protocols for Microwave Recharged Sensor Nodes," OpNeAR Lab, Erik Jonsson School of Engineering and Computer Science, University of Texas at Dallas, Date of Conference Jan. 31-Feb. 2, 2005, 12 pages.
ZTE, "Cooperation Scheme Considerations for Type II Relay," 3GPP TSG RAN #57, r1-091710, San Francisco, US, May 4-8, 2009, 4 pages.
Vodafone, "Further consideration on L2 transparent relay," 3GPP TSG-RAN WG1 #56bis, R1-091403, Seoul, Korea Mar. 23-27, 2009, 7 pages.
Second Chinese Office Action received on Application No. 201180000361.1, mailed Jul. 15, 2013, 10 pages. (Partial Translation).

* cited by examiner

US 9,584,229 B2

DATA RETRANSMISSION METHOD, APPARATUS, AND SYSTEM

CROSS-REFERENCE TO RELATED APPLICATIONS

This application is a continuation of International Application No. PCT/CN2011/072965, filed on Apr. 18, 2011, which is hereby incorporated by reference in their entireties.

TECHNICAL FIELD

The present invention relates to the field of communications, and in particular, to a data packet retransmission method, apparatus, and system.

BACKGROUND

A data packet of a wireless communication system often cannot be received correctly. To improve reliability of data transmission, An ARQ (Automatic Repeat Request, automatic repeat request) technology is provided in the prior art.

In the ARQ technology, an SW-ARQ (Stop and Wait ARQ, stop and wait automatic repeat request) technology and a GBN-ARQ (Go-Back-N ARQ, go-back-N automatic repeat request) technology are often used. In the SW-ARQ technology, when a receiving end returns a reception acknowledgment message (ACK) for a previous data packet, a transmitting end transmits a next data packet; and when the receiving end returns a reception negative acknowledgment message (NACK) for the previous data packet, the transmitting end retransmits the previous data packet. Therefore, by using this technology, a system resource is wasted in a process of waiting for ACK/NACK. In the GBN-ARQ technology, the transmitting end continuously transmits data packets in sequence; and when receiving NACK returned by the receiving end, the transmitting end stops transmitting a new data packet, retransmits a data packet that corresponds to the NACK, and retransmits, in sequence, data packets subsequent to the data packet that corresponds to the NACK. Compared with the SW-ARQ technology, by using the GBN-ARQ technology, a utilization ratio of a channel is improved.

During implementation of data retransmission by using GBN-ARQ, the inventor finds that the prior art has at least the following problems. A relay cooperation communications technology is more and more used in an existing communication system to improve a success ratio of data transmission; however, for GBN-ARQ, a solution of the relay cooperation communications technology is not used, and therefore, when data retransmission is performed by using the GBN-ARQ technology, a success ratio of data packet retransmission is relatively low.

SUMMARY OF THE INVENTION

Embodiments of the present invention provide a data retransmission method, apparatus, and system, which can improve a success ratio of data packet retransmission.

In order to achieve the foregoing objective, the embodiments of the present invention adopt the following technical solutions.

A data retransmission method includes monitoring and decoding, by a relay node, each data packet that is sent by a source node for a first time in go-back-N automatic repeat request GBN-ARQ mode to a destination node, storing a copy of a successfully decoded data packet, monitoring a response message to each data packet, where the response message is returned by the destination node to the source node, and sending a copy of a data packet that corresponds to a reception negative acknowledgment message NACK to the destination node, when the monitored response message is the reception negative acknowledgment message NACK.

A data retransmission apparatus includes a first monitoring and decoding unit, configured to monitor and decode each data packet that is sent by a source node for a first time in go-back-N automatic repeat request GBN-ARQ mode to a destination node, a copy storage unit, configured to store a copy of a successfully decoded data packet, a response monitoring unit, configured to monitor a response message returned by the destination node to the source node, and a copy sending unit, configured to send a copy of a data packet that corresponds to a reception negative acknowledgment message NACK to the destination node, when the monitored response message is the reception negative acknowledgment message NACK.

A data retransmission system includes a source node, configured to send a data packet to a destination node in go-back-N automatic repeat request GBN-ARQ mode, and receive a response message of the destination node to each data packet, a relay node, configured to monitor and decode each data packet that is sent by the source node for a first time in go-back-N automatic repeat request GBN-ARQ mode to the destination node, and store a copy of a successfully decoded data packet, and the destination node, configured to receive at least two data packets sent by the source node, and return a response message, where the relay node is further configured to send a copy of a data packet that corresponds to a reception negative acknowledgment message NACK to the destination node, when the monitored response message is the reception negative acknowledgment message NACK, and the destination node is further configured to receive the copy of the data packet, where the copy of the data packet is sent by the relay node.

With the data retransmission method, apparatus, and system provided in the embodiments of the present invention, in an existing GBN-ARQ protocol, a relay cooperation communications technology is used, and a relay node is set to perform monitoring and decoding and participate in performing data transmission, so that the relay node performs data retransmission according to a monitored response message when a communication system performs data retransmission in go-back-N mode, thereby improving a success ratio of data retransmission of the system.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The technical solutions in the embodiments of the present invention are described clearly in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
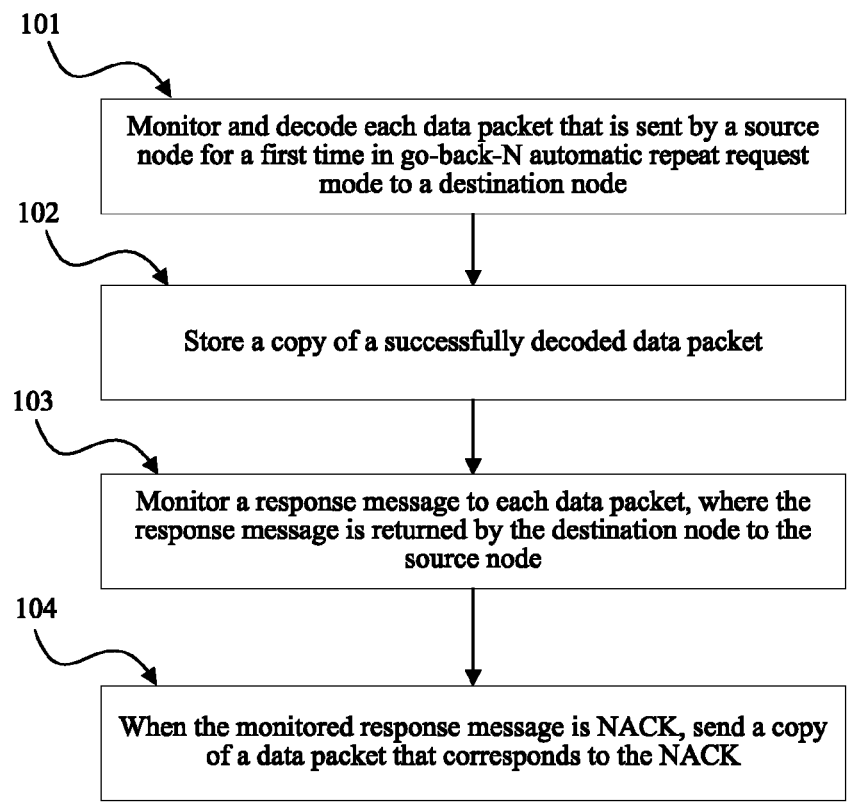
FIG. 1 is a flow chart of a data retransmission method according to Embodiment 1 of the present invention.

A first embodiment of the present invention provides a data retransmission method. As shown in FIG. 1, the method includes the following steps.

101: Monitor and decode each data packet that is sent by a source node for a first time in go-back-N automatic repeat request GBN-ARQ mode to a destination node.

When sending a data packet in go-back-N automatic repeat request (GBN-ARQ) mode, a source node continuously sends N data packets first, where the N data packets are at least two data packets. When the N data packets are sent, a relay node monitors and attempts to decode the data packets. After finishing sending the N data packets, the source node temporarily stops data packet sending and waits for return of ACK or NACK, where the ACK or NACK corresponds to a first sent data packet among the N sent data packets.

102: Store a copy of a successfully decoded data packet.

For a successfully decoded data packet, the relay node stores a copy of the data packet.

103: Monitor a response message to each data packet, where the response message is returned by the destination node to the source node.

When the destination node successfully receives a data packet sent by the source node, a returned response message is ACK; and when the destination node cannot successfully receive a data packet sent by the source node, a returned response message is NACK. The relay node monitors a response message to each data packet.

104: When the monitored response message is NACK, send a copy of a data packet that corresponds to the NACK.

When NACK is monitored, if a data packet that corresponds to the NACK is successfully decoded, the relay node sends, in a time slot that is in a frame and corresponds to the relay node itself, a copy of a data packet that corresponds to the monitored NACK to the destination node.

Figure 2:
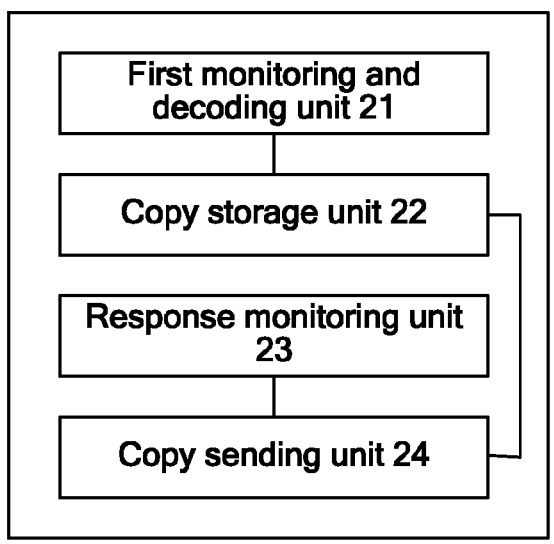
FIG. 2 is a block diagram of a data retransmission apparatus according to Embodiment 1 of the present invention.

An embodiment of the present invention further provides a data retransmission apparatus. As shown in FIG. 2, the apparatus includes a first monitoring and decoding unit 21, a copy storage unit 22, a response monitoring unit 23, and a copy sending unit 24.

The first monitoring and decoding unit 21 is configured to monitor and decode each data packet that is sent by a source node for a first time in go-back-N automatic repeat request GBN-ARQ mode to a destination node. The copy storage unit 22 is configured to store a copy of a successfully decoded data packet. The response monitoring unit 23 is configured to monitor a response message returned by the destination node to the source node. The copy sending unit 24 is configured to send a copy of a data packet that corresponds to NACK, when the monitored response message is the NACK.

With the data retransmission method and apparatus provided in the embodiments of the present invention, in an existing GBN-ARQ protocol, a relay cooperation communications technology is used, and a relay node is set to perform monitoring and decoding and participate in performing data transmission, so that the relay node performs data retransmission according to a monitored response message when a communication system performs data retransmission in go-back-N mode according to the GBN-ARQ protocol, thereby improving a success ratio of data retransmission of the system.

Figure 3:
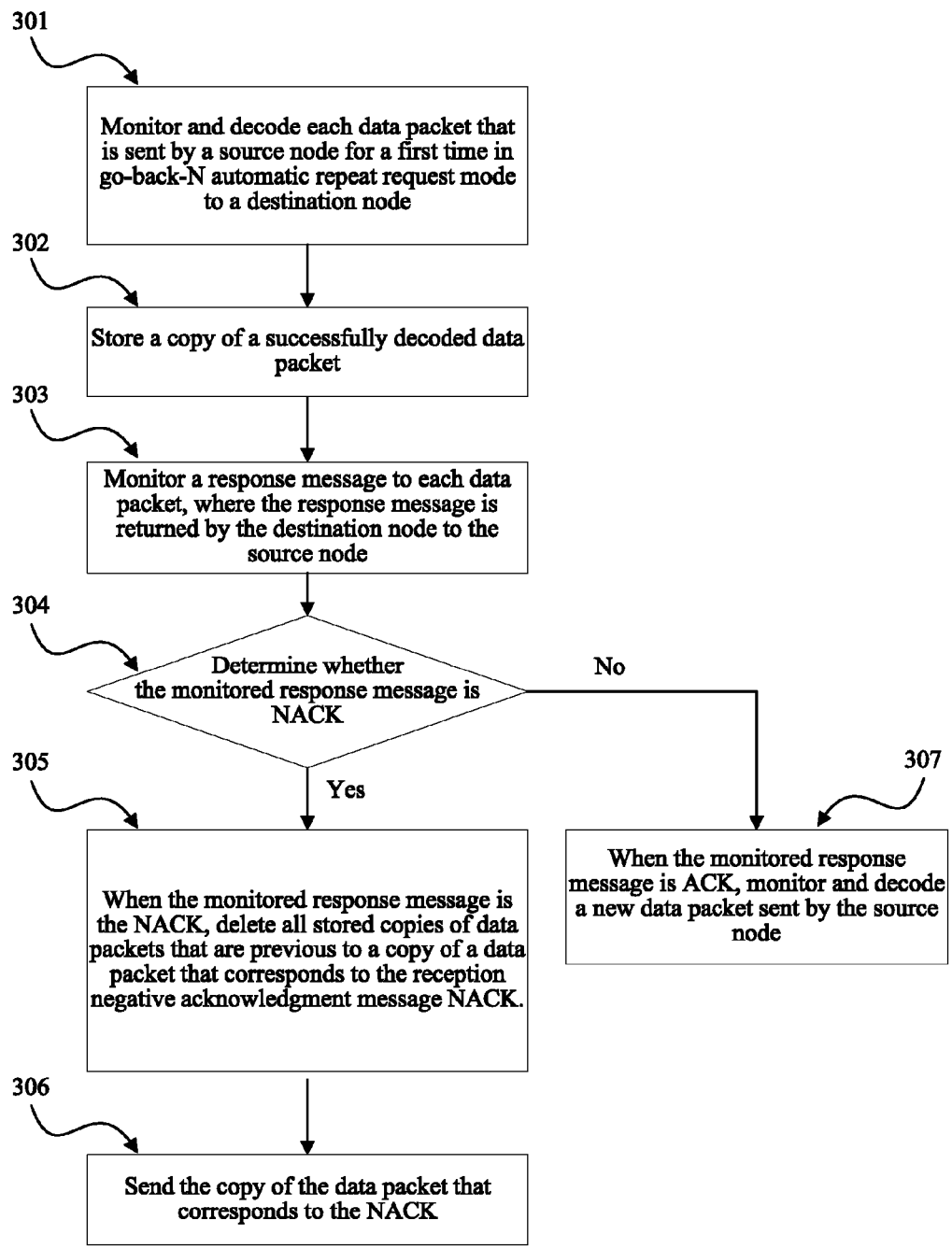
FIG. 3 is a flow chart of a data retransmission method according to Embodiment 2 of the present invention.

A second embodiment of the present invention provides a data retransmission method. As shown in FIG. 3, the method includes the following steps.

301: Monitor and decode each data packet that is sent by a source node for a first time in go-back-N automatic repeat request GBN-ARQ mode to a destination node.

When sending a data packet according to GBN-ARQ, a source node continuously sends N data packets first, where the N data packets are at least two data packets. When the N data packets are sent, a relay node monitors and attempts to decode the data packets.

After finishing sending the N data packets, the source node temporarily stops data packet sending, waits for return of ACK or NACK, where the ACK or NACK corresponds to a first sent data packet among the at least two sent data packets, and performs a next action according to a returned response message.

302: Store a copy of a successfully decoded data packet.

For a successfully decoded data packet, the relay node stores a copy of the data packet.

303: Monitor a response message to each data packet, where the response message is returned by the destination node to the source node.

When the destination node successfully receives a data packet sent by the source node, a returned response message is ACK; and when the destination node cannot successfully receive a data packet sent by the source node, a returned response message is NACK. The relay node monitors a response message to each data packet.

304: Determine whether the monitored response message is NACK.

If the monitored response message is NACK, perform step 305; otherwise, proceed to step 307.

305: When the monitored response message is the NACK, delete all stored copies of data packets that are previous to a copy of a data packet that corresponds to the reception negative acknowledgment message NACK.

306: Send the copy of the data packet that corresponds to the NACK.

A sequence between step 305 and step 306 may not be limited.

The NACK is also received by the source node. After receiving the NACK, the source node re-sends the data packet that corresponds to the NACK and a subsequent sent data packet.

Figure 8:
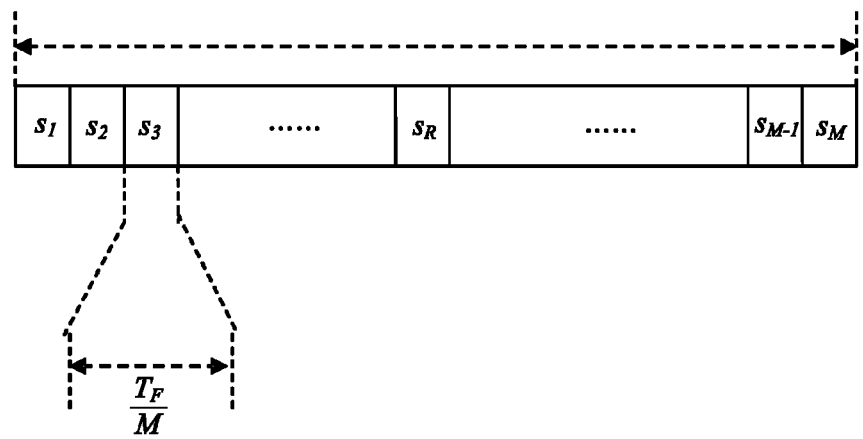
FIG. 8 is a schematic diagram of a structure of a frame according to Embodiment 2 of the present invention.

Specifically, in a frame in which the relay node sends the copy of the data packet that corresponds to the NACK, the source node also re-sends the data packet that corresponds to the NACK to the destination node. The source node re-sends the data packet and the relay node sends the copy of the data packet respectively in their corresponding time slot in the same frame. FIG. 8 is a schematic diagram of a structure of the frame. A duration of the whole frame is $T_F$, one frame is formed by M time slots, and a duration of each time slot is $T_F/M$. For example, a time slot $s_3$ is a time slot that corresponds to the source node, and a time slot $s_R$ is a time slot that corresponds to the relay node.

Generally, the destination node receives data packets in sequence, and when an error occurs to reception of a data packet, subsequent data packets are discarded. Therefore, after re-sending the data packet that corresponds to the NACK, the source node needs to re-send, in sequence, sent data packets subsequent to the data packet that corresponds to the NACK to the destination node. When the source node re-sends, in sequence, the sent data packets subsequent to the data packet that corresponds to the NACK, the relay node re-monitors and re-decodes a sent data packet that is not correctly decoded. Definitely, alternately the relay node may also re-monitor and re-decode all sent data packets that are re-sent by the source node in sequence and are subsequent to the data packet that corresponds to the NACK.

307: When the monitored response message is ACK, monitor and decode a new data packet sent by the source node.

After receiving the ACK, the source node continues to send a new data packet to the destination node; and at this time, the relay node monitors and attempts to decode the new data packet sent by the source node.

Figure 9:
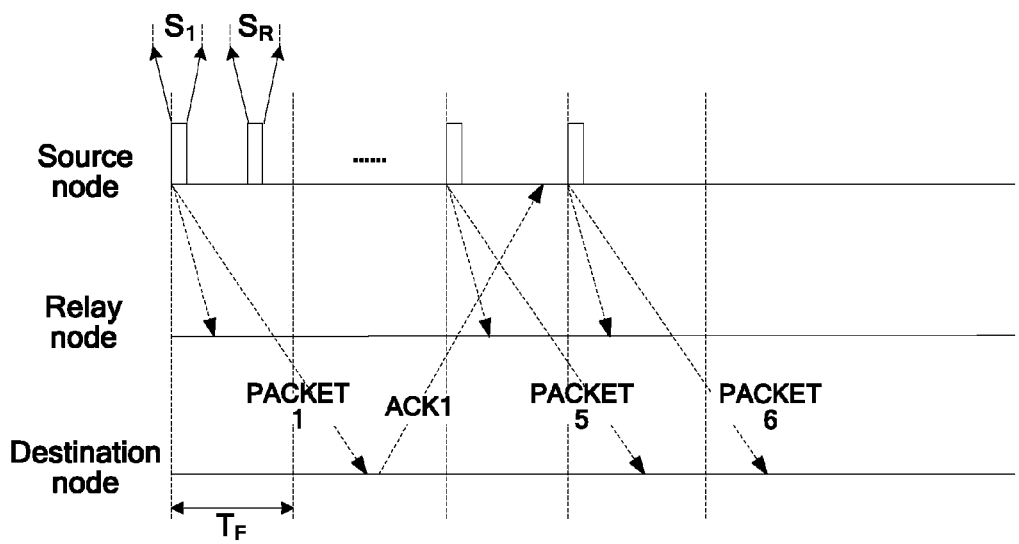
FIG. 9 is a schematic diagram of normally receiving/sending a data packet by each node according to Embodiment 2 of the present invention.

The method described in this embodiment of the present invention is described in the following by using an example. As shown in FIG. 9, it is assumed that a duration of a frame is $T_F$, the source node occupies a time slot $S_1$ of a frame to send a data packet, and the relay node occupies a time slot $S_R$ of a frame to send a copy of a data packet. It is assumed that, in a system shown in FIG. 9, when sending a data packet according to the GBN-ARQ, the source node first continuously sends 5 data packets in a sequence from PACKET1 to PACKET5, and then stops the sending and waits for return of ACK/NACK. For example, for the PACKET1, a response message of the PACKET1 is ACK1 or NACK1. When the source node sends a data packet, the relay node monitors the data packet. In FIG. 9, when the source node finishes sending the PACKET1 to PACKET5, a response message of the PACKET1 is returned to the source node. If the response message is ACK1, the source node continues to send a sixth data packet PACKET6, and the relay node continues to perform monitoring.

Figure 10:
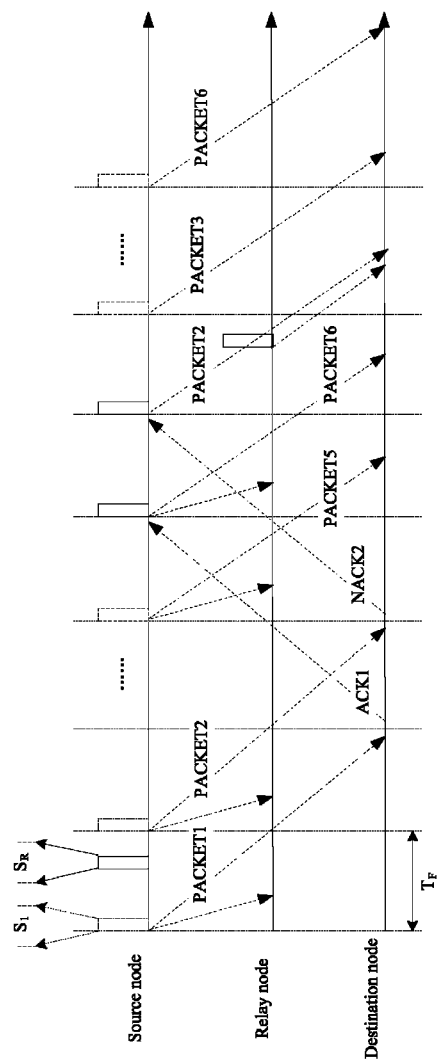
FIG. 10 is a schematic diagram of assisting a source node by a relay node in sending data according to Embodiment 2 of the present invention.
Figure 11:
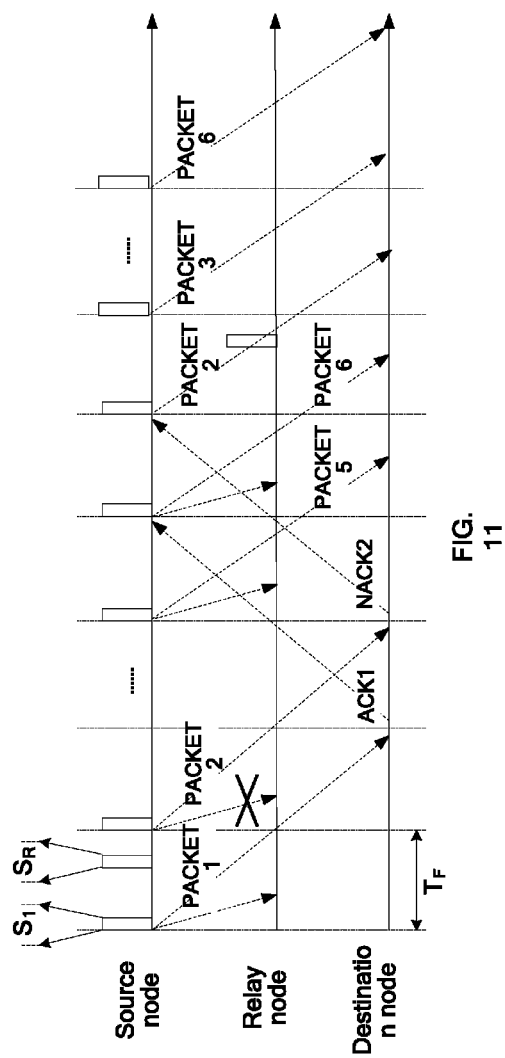
FIG. 11 is a schematic diagram showing that a relay node fails to decode a data packet and cannot send a copy of the data packet according to Embodiment 2 of the present invention.

When a response message of the second data packet PACKET2 is NACK2, if the relay node successfully decodes the PACKET2, the source node and the relay node respectively re-send, in their corresponding time slot in the same frame, the PACKET2 to the destination node, as shown in FIG. 10. Meanwhile, the source node re-sends all transmitted data packets subsequent to the second data packet, that is, PACKET3 to PACKET6. If the relay node fails to decode the PACKET2, the relay node cannot send a copy of the PACKET2 but only the source node re-sends the PACKET2, as shown in FIG. 11.

Figure 12:
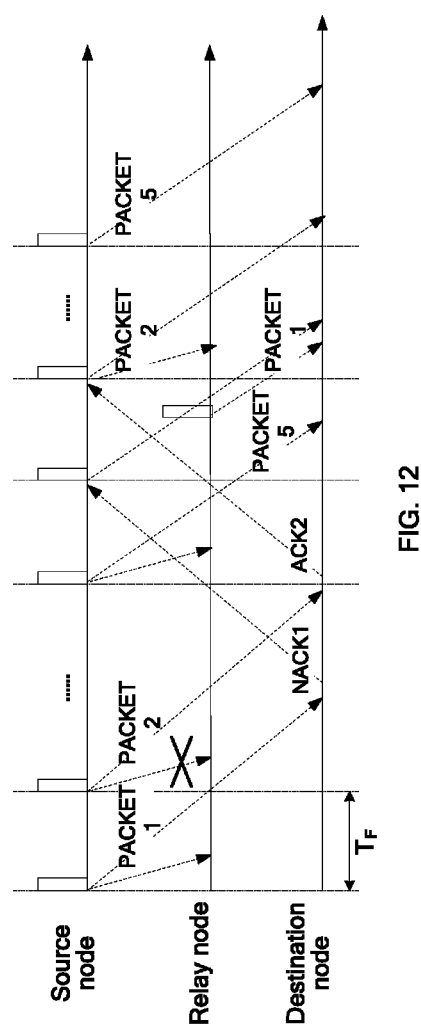
FIG. 12 is a schematic diagram showing that a relay node re-monitors and re-decodes a re-sent data packet according to Embodiment 3 of the present invention.

In addition, if the relay node fails to decode a packet subsequent to the data packet that corresponds to the NACK, the relay node re-monitors and re-decodes, in a re-sending process of the source node, the data packet that is subsequent to the data packet that corresponds to the NACK and fails to be decoded. As shown in FIG. 12, the relay node successfully decodes the PACKET1 but fails to decode the PACKET2, and a response message that corresponds to the PACKET1 is NACK1. After receiving the NACK1, the source node re-sends data packets from the PACKET1 to the PACKET5. When re-sending the PACKET2, the relay node re-monitors and re-decodes the PACKET2 that fails to be decoded. Definitely, alternately the relay node may also re-monitor and re-decode all the data packets from the PACKET1 to the PACKET5 that are re-sent by the source node in sequence.

With the data retransmission method provided in this embodiment of the present invention, in an existing GBN-ARQ protocol, a relay cooperation communications technology is used, and a relay node is set to perform monitoring and decoding and participate in performing data transmission, so that a source node and the relay node can perform data retransmission in different time slots in the same frame when a communication system performs data retransmission in go-back-N mode according to the GBN-ARQ protocol, thereby improving a success ratio of data retransmission of the system.

Figure 4:
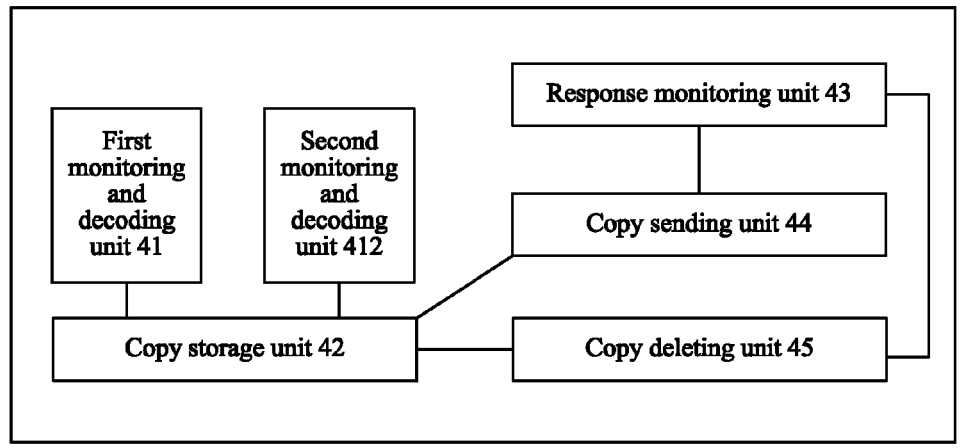
FIG. 4 is a block diagram of a data retransmission apparatus according to Embodiment 3 of the present invention.

A third embodiment of the present invention provides a data retransmission apparatus. As shown in FIG. 4, the apparatus includes a first monitoring and decoding unit 41, a copy storage unit 42, a response monitoring unit 43, a copy sending unit 44, and a copy deleting unit 45.

The first monitoring and decoding unit 41 is configured to monitor and decode each data packet that is sent by a source node for a first time in go-back-N automatic repeat request GBN-ARQ mode to a destination node. The copy storage unit 42 is configured to store a copy of a successfully decoded data packet. The response monitoring unit 43 is configured to monitor a response message returned by the destination node to the source node. The copy sending unit 44 is configured to send a copy of a data packet that corresponds to NACK, when the monitored response message is the NACK. The copy deleting unit 45 is configured to delete all stored copies of data packets that are previous to the copy of the data packet that corresponds to the NACK, after the NACK is monitored.

In a frame in which the copy storage unit 42 of the relay node sends the copy of the data packet that corresponds to the NACK, the source node also re-sends the data packet that corresponds to the NACK to the destination node, and the source node and the relay node respectively send a data packet in their corresponding time slot in the same frame.

When receiving ACK, the source node continues to send a new data packet to the destination node. At this time, the first monitoring and decoding unit 41 monitors and decodes the new data packet sent by the source node. In addition, after re-sending the data packet that corresponds to the NACK, the source node re-sends, in sequence, sent data packets subsequent to the data packet that corresponds to the NACK. Optionally, the apparatus may include a second monitoring and decoding unit 412, configured to re-monitor and re-decode a sent data packet that is not correctly decoded, when the source node re-sends the sent data packets subsequent to the data packet that corresponds to the NACK.

With the data retransmission apparatus provided in this embodiment of the present invention, in an existing GBN-ARQ protocol, a relay cooperation communications technology is used, and a relay node is used to perform monitoring and decoding and participate in performing data transmission, so that a source node and the relay node can perform data retransmission in different time slots in the same frame when a communication system performs data retransmission in go-back-N mode according to the GBN-ARQ protocol, thereby improving a success ratio of data retransmission of the system.

Figure 5:
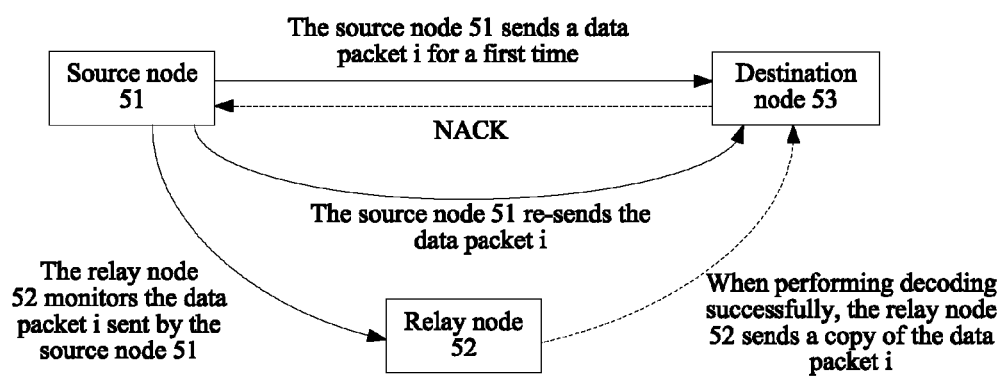
FIG. 5 is a block diagram of a data retransmission system when a response message is NACK according to Embodiment 4 of the present invention.
Figure 6:
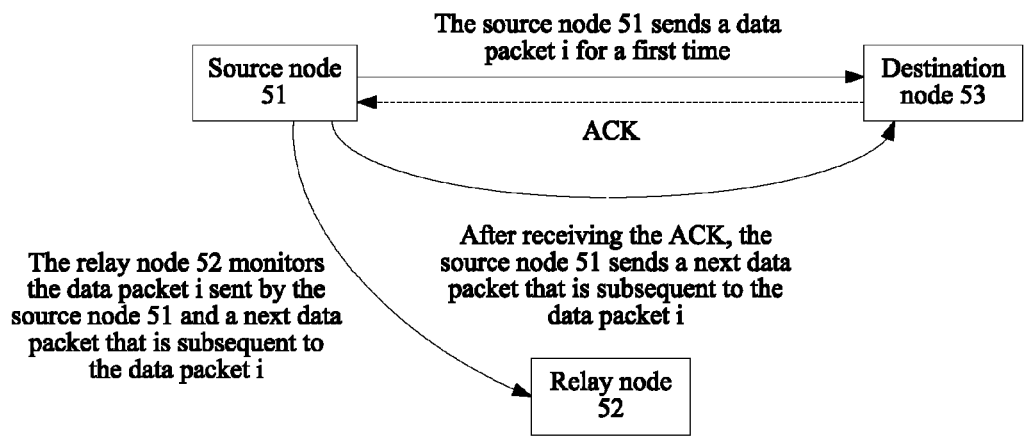
FIG. 6 is a block diagram of a data retransmission system when a response message is ACK according to Embodiment 4 of the present invention.

A fourth embodiment of the present invention provides a data retransmission system. As shown in FIG. 5 and FIG. 6, the system includes a source node 51, a relay node 52, and a destination node 53.

The source node 51 is configured to send N data packets to the destination node in go-back-N automatic repeat request GBN-ARQ mode, and receive a response message of the destination node to each data packet. The relay node 52 is configured to monitor and decode each data packet that is sent by the source node 51 for a first time in go-back-N automatic repeat request GBN-ARQ mode to the destination node, and store a copy of a successfully decoded data packet. The destination node 53 is configured to receive the N data packets sent by the source node 51, and return a response message to the source node 51.

Specifically, as shown in FIG. 5, the source node 51 sends a data packet i to the destination node 53, and the relay node 52 monitors and decodes the data packet i. When a response message that is received by the source node 51 and corresponds to the data packet i is NACK, the source node 51 re-sends the data packet i and re-sends, in sequence, sent data packets subsequent to the data packet i to the destination node 53. After monitoring the NACK, if the relay node 52 itself has successfully finished decoding the data packet i, the relay node 52 sends a copy of the data packet i.

In each frame, the source node 51 sends or re-sends data in a fixed time slot that corresponds to the source node 51. In the same frame in which the source node 51 re-sends the data packet that corresponds to the NACK, the relay node 52 sends, in its corresponding time slot, a copy of the data packet that corresponds to the NACK. The relay node 52 is further configured to re-monitor and re-decode a sent data packet that is not successfully decoded, when the source node re-sends all sent data packets.

When the response message received by the source node is ACK, the source node sends a new data packet subsequent to the data packet i, as shown in FIG. 6.

A decoding failure may occur when the relay node 52 monitors a data packet sent by the source node 51. When the relay node 52 fails to decode a data packet and the destination node 53 returns NACK for the data packet, after the relay node 52 monitors the NACK that corresponds to the data packet, the relay node 52 cannot send a copy of the data packet that fails to be decoded, but the source node 51 can re-send the data packet after the source node 51 receives the NACK.

After monitoring the NACK, the relay node 52 further needs to delete all stored copies of data packets that are previous to the copy of the data packet that corresponds to the NACK. By deleting all the stored copies of the data packets that are previous to the copy of the data packet that corresponds to the NACK, cache space of the relay node 52 is saved, so as to store a copy of a new arriving data packet.

Figure 7:
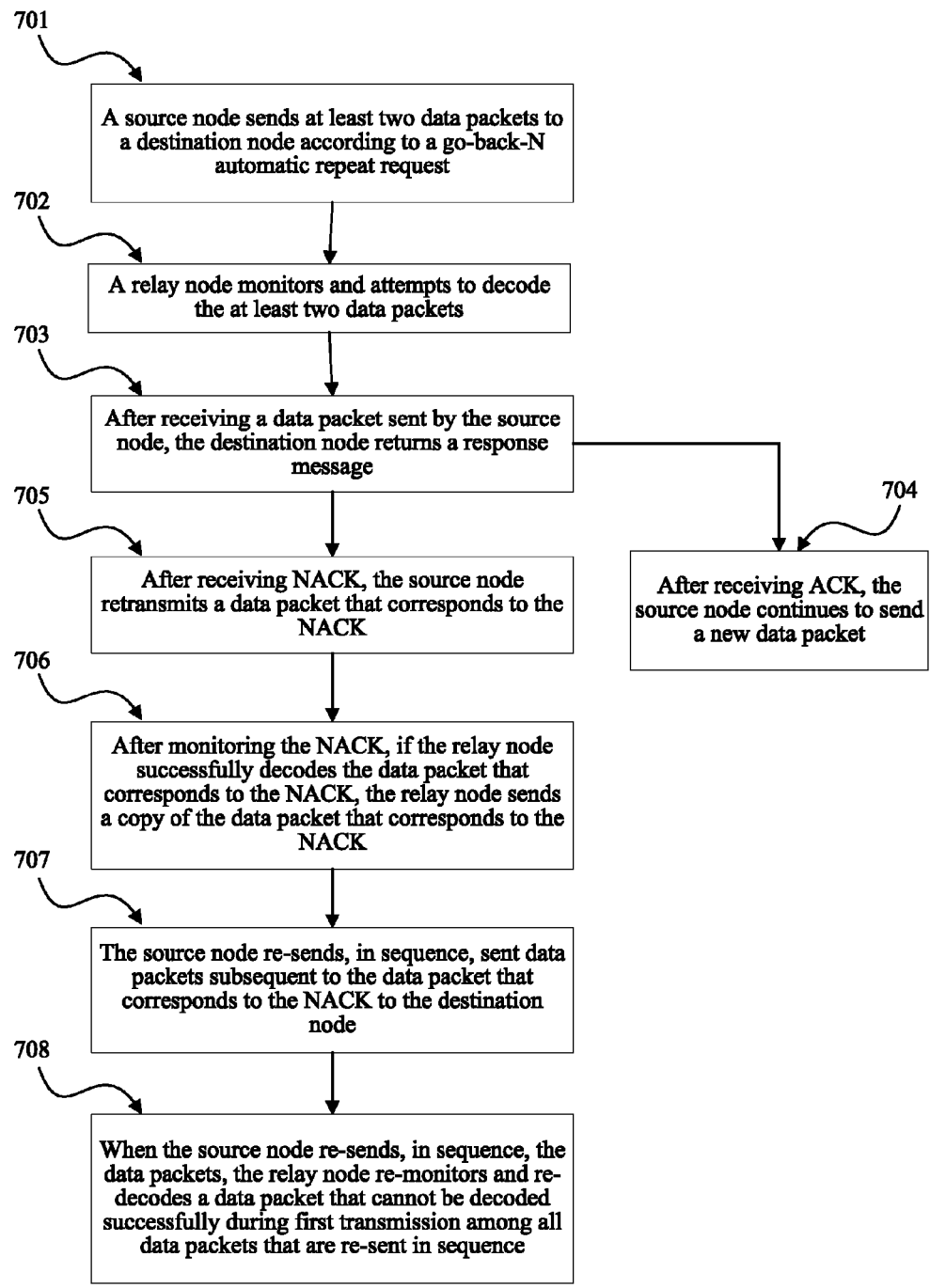
FIG. 7 is a flow chart of a working method of a data retransmission system according to Embodiment 4 of the present invention.

The data retransmission system provided in this embodiment of the present invention performs data transmission according to the following procedure, as shown in FIG. 7.

701: A source node sends N data packets to a destination node in go-back-N automatic repeat request GBN-ARQ mode, where the N data packets are at least two data packets.

702: A relay node monitors and attempts to decode the N data packets.

703: After receiving a data packet sent by the source node, the destination node returns a response message. If the data packet sent by the source node is successfully received and the returned response message is ACK, proceed to step 704; and if the data packet sent by the source node cannot be received successfully and the returned response message is NACK, proceed to step 705.

704: After receiving the ACK, the source node continues to send a new data packet.

705: After receiving the NACK, the source node retransmits a data packet that corresponds to the NACK.

706: After monitoring the NACK, if the relay node successfully decodes the data packet that corresponds to the NACK, the relay node sends a copy of the data packet that corresponds to the NACK.

After monitoring the NACK, the relay node needs to delete stored copies of data packets that are previous to the copy of the data packet that corresponds to the NACK. If the relay node cannot successfully decode the data packet that corresponds to the NACK, the relay node cannot send the copy of the data packet that corresponds to the NACK to the destination node.

After the relay node and the relay node finish retransmitting the data packet/transmitting the copy of the data packet, the procedure proceeds to step 707.

707: The source node re-sends, in sequence, sent data packets subsequent to the data packet that corresponds to the NACK to the destination node.

708: When the source node re-sends, in sequence, the data packets, the relay node re-monitors and re-decodes a data packet that cannot be decoded successfully during first transmission among all data packets that are re-sent in sequence.

Effects of this embodiment of the present invention are described in the following through a simulation experiment performed by using MATLAB software.

Parameters in the simulation experiment are described first.

A duration of each frame is $T_F$, each frame has M time slots, and a length of a time slot is $$\frac{T_F}{M}.$$

A delay between time of sending a data packet from a source node and time of receiving ACK/NACK is $T_R$, and it is assumed that $T_R = N \cdot T_F$, where $N > 1$.

Time of transmitting a data packet from the source node to a destination node is $T_t$.

Transmission time of returning ACK/NACK from the destination node to the source node is $T_f$.

It is assumed that a data packet that arrives at the destination node complies with Poisson distribution in which a parameter $\lambda=0.01$.

The following can be obtained:

$$T_R = T_F + T_t + T_f$$

A duration of a working status of a systems is $$\frac{T_F}{M}.$$

A duration of an idle status of the systems is $$\frac{(M-1)T_F}{M}.$$

An error probability is P when each frame is sent.

Required time for successfully transmitting a data packet is X.

When the system reaches a stable status, a throughput rate of the system is Th, and Th=1/X.

A required waiting time before each data packet obtains a service is W, and $$W = \frac{\lambda E(X^2)}{2(1-\rho)} + \frac{E(V^2)}{2E(V)},$$

where $$\rho = \lambda \cdot \overline{X} < 1.$$

Waiting time that a data packet waits for a time slot of a next frame is V.

The following can be obtained:

$$\frac{E(V^2)}{2E(V)} = \frac{T_F}{2}.$$

Based on the foregoing result, the following cant be obtained:

$$W = \frac{\lambda \cdot \overline{X^2}}{2(1-\rho)} + \frac{T_F}{2}.$$

A total transmission time of each data packet in the system is $T = W + \overline{X}$.

An average packet loss rate from the source node to the destination node is $\overline{P_{S,D}}$.

An average packet loss rate from the source node to a relay node is $\overline{P_{S,R}}$.

An average packet loss rate from the relay node to the destination node is $\overline{P_{R,D}}$.

For a GBN-ARQ technology and a technology (represented by GBN-CARQ in the simulation experiment) in this embodiment of the present invention, where the technology uses a relay cooperation communications technology on the basis of GBN-ARQ, when a data packet fails to be sent, the source node re-sends the data packet that fails to be sent and (N−1) sent data packets subsequent to the data packet that fails to be sent. Therefore, finally, the number of times required for successfully transmitting the data packets is:

$$E(K) = 1 \cdot (1-P_X^1) + (N+1) \cdot P_X^1 \cdot (1-P_X^2) + (2N+1) \cdot P_X^1 \cdot P_X^2 \cdot (1-P_X^2) + \ldots + (lN+1) \cdot P_X^1 \cdot P_X^{2l-1} \cdot (1-P_X^2),$$

where $P_X^1$, indicates a failure possibility of first transmission, and $P_X^2$ indicates a failure possibility of retransmission.

Therefore, the following can be obtained:

$$\overline{X} = (1-P_X^1) \cdot (T_F + T_f + T_t) + \sum_{l=1}^{\infty} (l \cdot T_R + (T_F + T_f + T_t)) \cdot P_X^1 \cdot P_X^{2l-1} \cdot (1-P_X^2)$$

$$= (T_F + T_f + T_t) + \frac{P_X^1 \cdot T_R}{1-P_X^2}$$

and $$\overline{X^2} = (T_F + T_f + T_t)^2 + \frac{2 \cdot P_X^1 \cdot T_R \cdot (T_F + T_f + T_t)}{1-P_X^2} + \frac{P_X^1 \cdot (1+P_X^2) \cdot T_R^2}{(1-P_X^2)^2}.$$

(1) For GBN-ARQ, a specific algorithm is:

$$Th = \frac{1}{\overline{X}} = \frac{1 - \overline{P_{S,D}}}{(1-\overline{P_{S,D}}) \cdot (T_F + T_f + T_t) + \overline{P_{S,D}} \cdot T_R},$$

where Th is a throughput rate of the whole system.

$$W = \frac{\lambda E(X^2)}{2(1-\rho)} + \frac{E(V^2)}{2E(V)} =$$

$$\frac{\lambda}{2(1-\rho)} \cdot \left( \begin{array}{c} (T_F + T_f + T_t)^2 + \frac{2 \cdot \overline{P_{S,D}} \cdot T_R \cdot (T_F + T_f + T_t)}{1-\overline{P_{S,D}}}, \\ + \frac{\overline{P_{S,D}} \cdot (1+P_X^2) \cdot T_R^2}{(1-\overline{P_{S,D}})^2} \end{array} \right) + \frac{T_F}{2}$$

where $$\rho = \lambda \cdot \overline{X} = \lambda \cdot \left( (T_F + T_f + T_t) + \frac{\overline{P_{S,D}} \cdot T_R}{1-\overline{P_{S,D}}} \right) < 1.$$

$$T = W + \overline{X} = W + (T_F + T_f + T_t) + \frac{\overline{P_{S,D}} \cdot T_R}{1-\overline{P_{S,D}}}$$

where T is time that each data packet stays in the system when the whole system reaches a stable status.

(2) For GBN-CARQ according to this embodiment of the present invention, a specific algorithm is:

$$Th = \frac{1}{\overline{X}} = \frac{1-P_X^2}{(1-P_X^2) \cdot (T_F + T_f + T_t) + \overline{P_{S,D}} \cdot T_R},$$

where Th is a throughput rate of the whole system.

$$W = \frac{\lambda E(X^2)}{2(1-\rho)} + \frac{E(V^2)}{2E(V)} =$$

-continued $$\frac{\lambda}{2(1-\rho)} \cdot \left( \begin{array}{c} (T_F + T_f + T_t)^2 + \frac{2 \cdot \overline{P_{S,D}} \cdot T_R \cdot (T_F + T_f + T_t)}{1 - P_X^2}, \\ + \frac{\overline{P_{S,D}} \cdot (1 + P_X^2) \cdot T_R^2}{(1 - P_X^2)^2} \end{array} \right) + \frac{T_F}{2}$$

where:

$$\rho = \lambda \cdot \overline{X} = \lambda \cdot \left( (T_F + T_f + T_t) + \frac{\overline{P_{S,D}} \cdot T_R}{1 - P_X^2} \right) < 1.$$

$$T = W + \overline{X} = W + (T_F + T_f + T_t) + \frac{\overline{P_{S,D}} \cdot T_R}{1 - P_X^2}$$

$$P_X^2 = \overline{P_{S,R}} \cdot \overline{P_{S,D}} + (1 - \overline{P_{S,R}}) \cdot \overline{P_{R,D}},$$

where T is time that each data packet stays in the system when the whole system reaches a stable status.

Table 1 shows settings of basic parameters in (1) and (2).

TABLE 1

| $T_R$ | $T_f$ | $\lambda$ | N |
|---|---|---|---|
| 8 | 0.2 | 0.01 | 8 |

Figure 13:
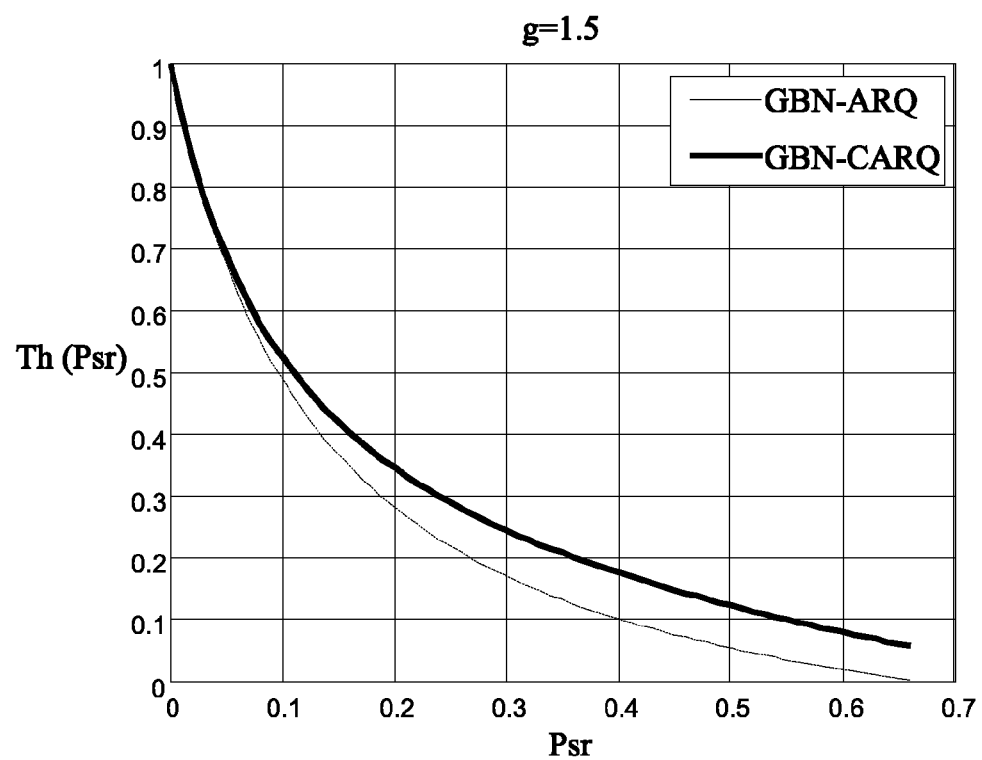
FIG. 13 is a simulation data diagram of a simulation experiment according to Embodiment 4 of the present invention.
Figure 14:
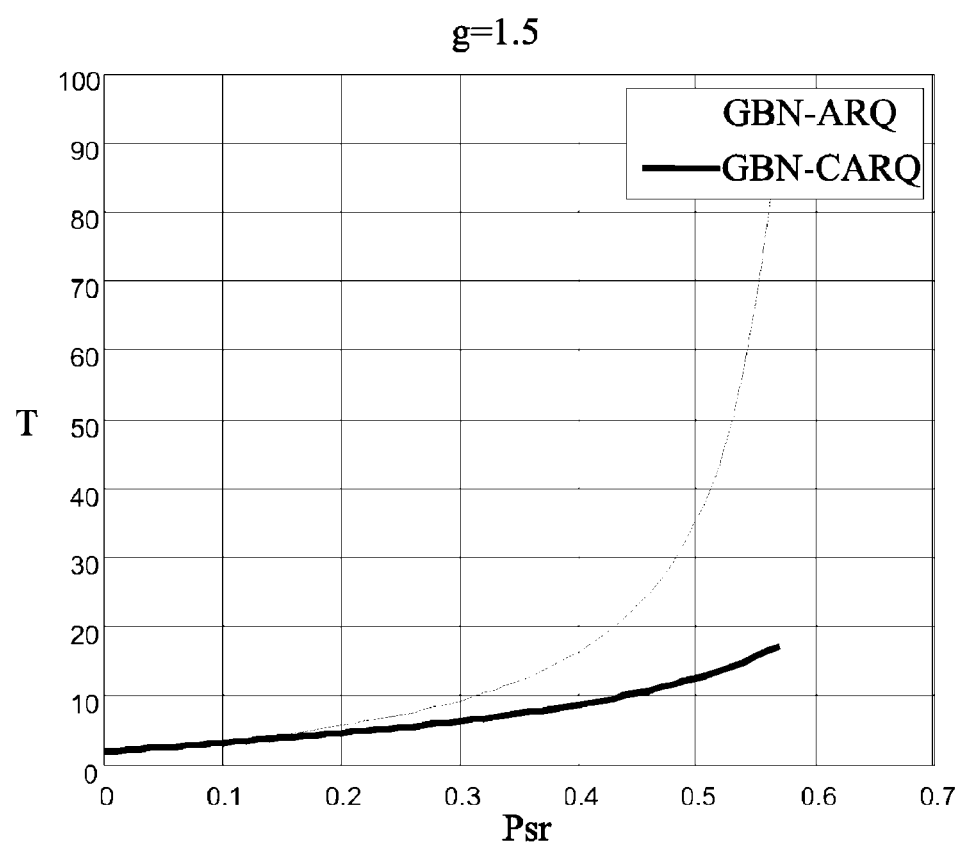
FIG. 14 is a simulation data diagram of a simulation experiment according to Embodiment 4 of the present invention.

To facilitate calculation, $\overline{P_{S,R}} = \overline{P_{R,D}}$ may be assumed in the simulation. According to calculation formulas of Th in (1) and (2), the MATLAB software is run to obtain a curve shows that Th changes along the average packet loss rate $\overline{P_{S,R}}$, as shown in FIG. 13. It can be seen that a throughput rate of the GBN-CARQ technology is higher than that of the GBN-ARQ technology when the average packet loss rate increases. In addition, a curve shows that T changes along $\overline{P_{S,R}}$ can also be obtained, as shown in FIG. 14. It can be seen that increasing amplitude of T in the GBN-CARQ technology is lower than that of T in the GBN-ARQ technology when the average packet loss rate increases, that is, in the GBN-CARQ technology, time that each data packet stays in the system is shorter when the whole system reaches a stable status.

With the data retransmission system provided in this embodiment of the present invention, in an existing GBN-ARQ protocol, a relay cooperation communications technology is used, and a relay node is used to perform monitoring and decoding and participate in performing data transmission, so that a source node can retransmit a data packet and the relay node can send a copy of a data packet in different time slots in a retransmission frame respectively when a communication system performs data retransmission in go-back-N mode according to the GBN-ARQ protocol, thereby improving a success ratio of data retransmission of the system and also improving a throughput rate of the whole system.

Through the foregoing description of the embodiments, persons skilled in the art may clearly understand that the present invention may be implemented by software plus necessary universal hardware, and definitely may also be implemented by hardware, but in many cases, the software implementation is preferred. Based on such an understanding, the technical solutions of the present invention essentially, or the part contributing to the prior art may be implemented in the form of a software product. The computer software product is stored in a readable storage medium, for example, a floppy disk, a hard disk, or an optical disk of a computer, and includes several instructions for instructing a computer device (which may be a personal computer, a server, or a network device) to perform the methods described in the embodiments of the present invention.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the claims.

What is claimed is:

1. A data retransmission method, comprising:
   monitoring and decoding, by a relay node, each data packet that is sent by a source node for a first time in a go-back-N automatic repeat request (GBN-ARQ) mode to a destination node;
   storing a copy of a successfully decoded data packet by the relay node;
   monitoring, by the relay node, a response message to each data packet between the destination node and the source node, wherein the response message is returned by the destination node to the source node;
   deleting, by the relay node and in response to the response message being a reception negative acknowledgment message, all stored copies of data packets that are previous to a data packet that corresponds to the reception negative acknowledgment message; and
   sending, by the relay node to the destination node and in response to the response message being the reception negative acknowledgment message, the copy of the data packet that was successfully decoded, wherein the copy of the data packet corresponds to the reception negative acknowledgment message, and wherein the copy of the data packet is sent in a first time slot of a first frame, the first frame including a copy of the data packet re-sent by the source node in a second time slot of the first frame different from the first time slot.

2. The data retransmission method according to claim 1, wherein after re-sending the data packet that corresponds to the reception negative acknowledgment message, the source node re-sends, in sequence, sent data packets subsequent to the data packet that corresponds to the reception negative acknowledgment message.

3. The data retransmission method according to claim 2, further comprising:
   when the source node re-sends the sent data packets subsequent to the data packet that corresponds to the reception negative acknowledgment message, re-monitoring and re-decoding, by the relay node, a sent data packet that is not correctly decoded.

4. The data retransmission method according to claim 2, further comprising:
   when the source node re-sends the sent data packets subsequent to the data packet that corresponds to the reception negative acknowledgment message, re-monitoring and re-decoding, by the relay node, all sent data packets that are re-sent by the source node in sequence and are subsequent to the data packet that corresponds to the reception negative acknowledgment message.

5. A data retransmission apparatus, comprising:
   a first monitoring and decoding unit disposed in a relay node, configured to monitor and decode each data packet that is sent by a source node for a first time in go-back-N automatic repeat request (GBN-ARQ) mode to a destination node;

a memory, configured to store a copy of a successfully decoded data packet;

a response monitoring unit, configured to monitor a response message returned by the destination node to the source node;

a copy deleting unit, configured to, delete, in response to the response message being a reception negative acknowledgment message, all stored copies of data packets that are previous to a data packet that corresponds to the reception negative acknowledgment message; and a transmitter, configured to send, to the destination node, a copy of the data packet that was decoded and that corresponds to the reception negative acknowledgment message, in response to the monitored response message being the reception negative acknowledgment message, and wherein the copy of the data packet is sent in a first time slot of a first frame, the first frame including a copy of the data packet re-sent by the source node in a second time slot of the first frame different from the first time slot.

6. The data retransmission apparatus according to claim 5, further comprising:

a second monitoring and decoding unit, configured to re-monitor and re-decode a sent data packet that is not correctly decoded, when the source node re-sends sent data packets subsequent to the data packet that corresponds to the reception negative acknowledgment message.

7. The data retransmission apparatus according to claim 5, further comprising:

a second monitoring and decoding unit, configured to re-monitor and re-decode all sent data packets that are re-sent by the source node in sequence and are subsequent to the data packet that corresponds to the reception negative acknowledgement message.

8. A data retransmission system, comprising:

a destination node;

a source node, configured to send a data packet to the destination node in go-back-N automatic repeat request (GBN-ARQ) mode and to receive a response message of the destination node to the data packet; and a relay node, configured to monitor and decode the data packet that is sent by the source node for the GBN-ARQ mode to the destination node and to store a copy of the successfully decoded data packet;

wherein the destination node is configured to receive the data packet sent by the source node and to return a response message;

wherein the relay node is further configured to send, to the destination node, a copy of a data packet that corresponds to a reception negative acknowledgment message in response to the relay node monitoring communication between the destination node and the source node, further in response to the relay node determining that reception negative acknowledgment message was sent from the destination node to the source node, and further in response to the monitored response message being the reception negative acknowledgment message, and wherein the copy of the data packet is sent in a first time slot of a first frame, the first frame including a copy of the data packet re-sent by the source node in a second time slot of the first frame different from the first time slot;

wherein the relay node is further configured to delete, in response to the response message being the reception negative acknowledgment message, all stored copies of data packets that are previous to the data packet that corresponds to the reception negative acknowledgment message; and wherein the destination node is further configured to receive the copy of the data packet, wherein the copy of the data packet is sent by the relay node.

9. The data retransmission system according to claim 8, wherein the source node is further configured to, after re-sending the data packet that corresponds to the reception negative acknowledgment message, re-send, in sequence, all sent data packets subsequent to the data packet that corresponds to the reception negative acknowledgment message.

10. The data retransmission system according to claim 9, wherein the relay node is further configured to re-monitor and re-decode a sent data packet that is not correctly decoded, when the source node re-sends all the sent data packets.

11. The data retransmission system according to claim 9, wherein the relay node is further configured to re-monitor and re-decode all the sent data packets that are re-sent by the source node in sequence and are subsequent to the data packet that corresponds to the reception negative acknowledgment message.

* * * * *